United States Patent Office 2,716,638
Patented Aug. 30, 1955

2,716,638

DIVINYLTETRAMETHYLDISILOXANE AND POLYMERS THEREFROM

Merrill Cohen, Jamaica Plain, Mass., and John R. Ladd, Alplaus, N. Y., assignors to General Electric Company, a corporation of New York No Drawing. Application November 22, 1952,
Serial No. 322,150

11 Claims. (Cl. 260—46.5)

This invention relates to a novel monomeric vinyl compound and polymers prepared therefrom. More particularly the invention is concerned with a new and useful composition of matter comprising divinyltetramethyldisiloxane and products of polymerization of masses comprising the aforesaid divinyltetramethyldisiloxane.

In accordance with the practice of our invention, vinyldimethylethoxysilane having the formula $$(CH_2=CH)(CH_3)_2SiOC_2H_5$$

is hydrolyzed to give divinyltetramethyldisiloxane having the formula

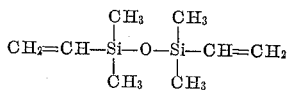

This monomeric divinyltetramethyldisiloxane (hereinafter referred to as "disiloxane"), may be copolymerized with other copolymerizable materials using any of the methods now known in the art. For example, the disiloxane with the other copolymerizable material may be dissolved in a suitable inert solvent, for example, an aromatic hydrocarbon solvent (such as benzene, toluene, xylene, etc.) and polymerization of the mixture effected. Another method which may be employed in preparing copolymers of the instant claimed invention includes the preparation of an intimate mixture of the monomeric materials by preparing suspensions or emulsions of the disiloxane and the copolymerizable material in a liquid medium as, for example, water.

In producing the claimed polymers, polymerization of the monomeric materials may be carried out by means of heat alone, or may be accelerated by means of vinyl polymerization catalysts usually employed for the purpose. Examples of such polymerization catalysts are oxygen, ozone, ozonides, hydrogen peroxide, organic and inorganic acids and acidic substances, e. g., hydrochloric acid, sulfuric acid, boron fluoride, antimony pentachloride, etc.; organic and inorganic peroxides, for instance, peroxides of the aromatic acid series, e. g., benzoyl peroxide, tertiary butyl perbenzoate, etc.; peroxides of the aliphatic acids, for example, tertiary butyl hydroperoxide, acetyl peroxide, stearyl peroxide, lauryl peroxide, etc.; sodium peroxide, barium peroxide, etc., various percompounds, such as persulphates, perchlorates, perborates, etc. Heat, light (ultra violet light), or heat and light may be used with or without a polymerization catalyst in accelerating the polymerization.

Where catalysts are employed for accelerating the polymerization, catalyst concentration may be varied, for example, within the range of from about 0.005 to 3 or 4 per cent or more, by weight, of the polymerization mixture including the solvent, and suspension or emulsion medium if such are employed. If no such media are employed and the mixture of monomers is employed alone, it is advantageous to use from about 0.1 to 2 per cent of the catalyst, based on the total weight of the monomers used.

The temperatures at which polymerization may be effected generally lie within the range of from about 35° to 120° C., depending upon the presence or absence of solvents, the type of polymerizable materials employed, and the properties desired in the finally polymerized product. The rate of polymerization is accelerated at higher temperatures, but this usually results in an undesirable reduction in the molecular weight of the finally polymerized product.

The homopolymer of divinyltetramethyldisiloxane may be obtained by heating the monomeric material in the presence of a vinyl polymerization catalyst at elevated temperatures to give products which are crosslinked and substantially infusible and insoluble. The monomeric divinyltetramethyldisiloxane may be copolymerized with a great number of copolymerizable

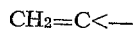

containing compounds. Examples of such compositions of matter are dienes, e. g., butadiene, isoprene, piperylene, etc.; vinyl-substituted aromatic hydrocarbons, e. g., styrene, methylstyrene, divinylbenzene, vinylfluorenes; acenaphthylene, etc.; acrylic acid and its derivatives, e. g., methacrylic acid, acrylonitrile, acrylamide, methacrylonitrile, methacrylamide, esters of acrylic and methacrylic acids, for example, methyl acrylate, ethyl acrylate, methyl methacrylate, etc.; ethylenically unsaturated halogenated or unhalogenated aliphatic hydrocarbons, e. g., ethylene, chloroethylene, fluoroethylenes, chlorofluoroethylenes, etc., and the like.

The copolymerization products of the present invention may be varied in accordance with the nature of the copolymerizable ingredient or ingredients which are copolymerized with the disiloxane. The proportion of copolymerizable monomers may be varied within broad limits. Although the proportion, by weight, ordinarily will be within the range of from 10 to 90 per cent of the divinyl tetramethyldisiloxane to 90 to 10 per cent of the other monomer or monomers, we do not intend to be limited to such range since higher or lower proportions of the divinyltetramethyldisiloxane and the other copolymerizable ingredient or ingredients may be employed, for instance, from about 1 to 99 per cent, by weight, of the divinyltetramethyldisiloxane to from 99 to 1 per cent, by weight, of the other monomeric material or materials. We preferably employ copolymerizable mixtures containing, by weight, from 1 to 75 per cent of the divinyltetramethyldisiloxane based on the total weight of the copolymerizable ingredients.

Additional functionality can be introduced by the employment of other cross-linking agents such as divinyl and diallyl compounds. Such products, which have increased heat resistance and can be readily machined and worked, tend toward increased insolubility and infusibility as the per cent of the divinyl or diallyl compounds increase. The copolymers of divinyltetramethyldisiloxane with other vinyl compounds containing only one $CH_2=C<$ grouping, many examples of which have been given previously, are also thermosetting substantially infusible and insoluble, and can be machined. Alternatively solutions of the copolymerizable mixture can be cast into films, and thereafter cured to the infusible and insoluble state.

In order that those skilled in the art may better understand how the present invention may be practiced, the following examples are given by way of illustration and not by way of limitation. All parts are by weight.

*Example 1*

A mixture of magnesium (2.63 moles) and absolute ether (800 ml.) was placed in a reaction vessel equipped with a stirrer, condenser cooled with Dry Ice, a gas inlet tube. Methyl bromide was bubbled into the stirred mixture of ether and magnesium until all the magnesium had dissolved. After excess methyl bromide had been allowed to evaporate from the solution, the methyl magnesium bromide solution was added to a stirred solution of 500 grams (2.63 moles) vinyltriethoxysilane and 960 ml. diethyl ether contained in a reaction vessel fitted with a stirrer and condenser. Precaution was taken that all outlets were protected from outside moisture. The rate of addition was such that the ether refluxed gently.

The mixture was stirred under reflux for approximately one hour and the ether removed by distillation. The distillation was then continued at atmospheric pressure until the temperature of the distillate reached about 100° C. The remainder of the silanes were separated from the residue of magnesium salts at a reduced pressure of about 40 mm. Fractional distillation of the silane mixture yielded a liquid having a boiling point of 99° C. at atmospheric pressure, $n_D^{20}$ 1.3983, $d_4^{20}$ 0.790, MR 39.8 (calculated 39.8). Analysis of this latter fraction showed it to be vinyldimethylethoxysilane as evidenced by the fact that it contained 55.4% carbon, 11.1% hydrogen, and 21.0% silicon (calculated carbon 55.3%, hydrogen 10.8%, and silicon 21.5%).

*Example 2*

About 20.9 grams of the vinyldimethylethoxysilane prepared above together with 100 ml. acetone and 10 ml. of 0.1 N. HCl were placed in a reaction vessel fitted with a reflux condenser. The solution was refluxed four hours and the acetone was distilled off until two phases appeared in the residue. The non-aqueous phase was separated and the aqueous phase further distilled until acetone ceased evolving. The non-aqueous phase was again separated and both disiloxane fractions combined. After drying the latter combined fractions over calcium chloride, they were distilled to give, in approximately a 61% yield, the compound divinyltetramethyldisiloxane having the formula

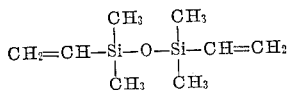

This material (boiling point 137° C. at atmospheric pressure), after drying was found to have a refractive index $n_D^{20}$ 1.4120, and a density $d_4^{20}$ 0.809. Analysis of this compound showed it to contain 50.9% carbon, 9.4% hydrogen, and 29.5% silicon (calculated 51.6% carbon, 9.7% hydrogen, and 30.1% silicon).

*Example 3*

A mixture of ingredients comprising, by weight, 15% divinyltetramethyldisiloxane and 85% methyl methacrylate, and containing 0.5%, by weight, based on the weight of the copolymerizable ingredients, of benzoyl peroxide, was heated in an oxygen-free, inert (nitrogen) atmosphere at around 80° C. for about 15 hours and thereafter for 24 hours at 100° C. At the end of this time, there was obtained a rigid homogeneous solid product which showed no tendency to dissolve in acetone over a period of several weeks indicating the cross-linking action of the disiloxane. In contrast to this, when pure methyl methacrylate was polymerized in the same manner as described above, it dissolved in the acetone in less than 24 hours.

*Example 4*

A mixture of ingredients comprising, by weight, 85% acrylonitrile and 15% divinyltetramethyldisiloxane and containing 0.5%, by weight, based on the weight of copolymerizable ingredients of benzoyl peroxide, was treated in the same manner as described above in Example 3 with the exception that the curing conditions were for 15 hours at 60° C. and 8 hours at 100° C. At the end of this time, there was obtained a solid hard product which only swelled but did not dissolve in dimethyl formamide. In contrast this pure acrylonitrile polymer, when prepared in the same manner as above dissolved readily in this solvent.

*Example 5*

A mixture of ingredients comprising, by weight, 15% divinyltetramethyldisiloxane and 85% vinyl acetate, and containing 1%, by weight, of the copolymerizable ingredients, of benzoyl peroxide, was heated in the same oxygen-free atmosphere as described above in Example 3 with the exception that the heating conditions consisted of 48 hours at 60° C. and eight hours at 100° C. At the end of this time, there was obtained a clear, firm solid slightly flexible copolymer which was substantially infusible and insoluble and merely swelled in acetone as contrasted to pure polyvinyl acetate prepared in the same manner which dissolved rapidly in the acetone.

It will, of course, be apparent to those skilled in the art that instead of using the copolymerizable monomeric materials employed above, other copolymerizable compounds may be separately or simultaneously copolymerized with the divinyltetramethyldisiloxane to obtain new and useful synthetic compositions. For instance, any compound containing a polymerizable $CH_2=C<$ grouping in its molecular structure, that is, compounds containing a single $CH_2=C<$ grouping or a plurality (two, three, four or more) of $CH_2=C<$ groupings in the structure of the individual compound may be used. Examples of such compounds are the esters, nitriles and amides of acrylic and α-substituted acrylic acids, vinyl esters and halides, methylene malonic esters, mono- and poly-allyl compounds, e. g., the di-, tri-, tetra- (and higher) allyl derivatives. For instance, the copolymerizable material may be a poly-allyl ester of an inorganic polybasic acid, or of a saturated or unsaturated aliphatic polycarboxylic acid or of an aromatic polycarboxylic acid. Specific examples of compounds that may be employed, in addition to those hereinbefore mentioned are: benzyl acrylate, benzyl methacrylate, methyl alpha-chloroacrylate, ethyl alpha-bromoacrylate, propyl alpha-chloroacrylate, parachlorostyrene, allyl acrylate, allyl methacrylate, tetra-allyl silane methallyl acrylate, di- and tri-chlorostyrenes, chlorinated divinylbenzenes, vinyl methyl ether, vinyl ethyl ether, divinyl ether, methylene methyl malonate, methylene ethyl malonate, vinyl chloride, vinylidene chloride, diethylene glycol dimethacrylate, glyceryl triacrylate, ethylene glycol diacrylate (ethylene diacrylate) diethylene itaconate, diethyl maleate, dimethyl fumarate, para-chlorobenzyl acrylate, diallyl fumarate, diethyl itaconate, diallyl citraconate, divinyl biphenyl, vinyl methyl ketone, cyclopentadiene, 2 - chloro-butadiene - 1,3 (chloroprene), 2,3 - dimethyl-butadiene-1,3, chlorinated methylstyrenes, chlorinated vinylinaphthalenes, hexadiene-1,5, octadiene-1,4, 2-cyanobutadiene-1,3, dimethylallyl maleate, dimethallyl itaconate, dimethallyl phthalate, amyl acrylate, hexyl methacrylate, triallyl citrate, triallyl aconitate, triallyl cyanurate, vinyl acetate, vinyl propionate, vinyl butyrate.

Obviously, the proportions of ingredients employed may be varied widely as pointed out above and, of course, the copolymers of this invention may, in general, be modified to fill the requirements of specific applications for which they may not ordinarily be suitable. For example, plasticizers and fillers may be added to the mixtures of monomers prior to polymerization thereof or they may be added after the polymerization has been completed.

In general, plasticizers commonly used for polymers and copolymers known to the art may be employed in plasticizing the polymeric materials embraced by this invention. The selection of the proper plasticizers depends largely upon the properties desired in the final product. Useful molding compositions may also be prepared by mixing the homopolymers or copolymers with suitable fillers, such as, for example, alpha cellulose, mica dust, titanium dioxide, talc, zinc oxide, magnesium oxide, asbestos, quartz, wood flour, cellulose, or wool fibers, etc.

The copolymers of this invention have a wide variety of commercial applications. They can be used alone or in combination with other insulating materials, for example, paper, fabric materials formed of glass fibers, cotton, silk, rayon, nylon, etc., sheet asbestos, cellulose esters (e. g., cellulose acetate, cellulose acetobutyrate, etc.), cellophane, etc., as dielectric materials in electrical apparatus. For instance, capacitors and other electrical devices may contain a dielectric material comprising the product of polymerization of a polymerizable mass containing divinyltetramethyldisiloxane as an essential ingredient.

Paper-insulated capacitors wherein paper impregnated with a composition comprising a polymer of divinyltetramethyldisiloxane constitutes the dielectric material is a more specific example of the use of a composition of our invention in electrical applications. Our new polymers may also be employed as cable imgregnants, in impregnating electrical coils, as filling compound in potheads and cable joints, and in numerous other electrical applications. The device to be treated may be impregnated or filled with the polymerizable mixture (for example, the mixture of monomers, mixture of partial polymers or copolymers, or mixtures of monomer and partial polymer), and the polymerization effected in situ.

What we claim as new and desire to secure by Letters Patent of the United States is:

1. Divinyltetramethyldisiloxane.
2. An interpolymer of (1) divinyltetramethyldisiloxane and (2) a different $CH_2=C<$-containing compound which is copolymerizable with the divinyltetramethyldisiloxane.
3. An interpolymer of divinyltetramethyldisiloxane and methyl methacrylate.
4. An interpolymer of divinyltetramethyldisiloxane and vinyl acetate.
5. An interpolymer of divinyltetramethyldisiloxane and acrylonitrile.
6. An interpolymer of (1) divinyltetramethyldisiloxane and (2) a different $CH_2=C<$-containing compound which is copolymerizable with the divinyltetramethyldisiloxane, the former comprising from 1 to 75 per cent, by weight, of the total weight of the interpolymer.
7. A process for preparing an interpolymer of divinyltetramethyldisiloxane and a different $CH_2=C<$-containing compound which is copolymerizable with the divinyltetramethyldisiloxane, which process comprises heating a mixture comprising the two foregoing monomeric materials in the presence of a vinyl polymerization catalyst.
8. The process as in claim 7 wherein the vinyl polymerization catalyst is benzoyl peroxide.
9. The process as in claim 7 wherein the copolymerizable material is methyl methacrylate.
10. The process as in claim 7 in which the copolymerizable materials is acrylonitrile.
11. The process as in claim 7 in which the copolymerizable materials is vinyl acetate.

References Cited in the file of this patent

UNITED STATES PATENTS

| | | |
|---|---|---|
| 2,388,161 | Kropa | Oct. 30, 1945 |
| 2,438,520 | Robie | Mar. 30, 1948 |
| 2,448,391 | Pyle | Aug. 31, 1948 |
| 2,532,583 | Tyron | Dec. 5, 1950 |
| 2,600,307 | Lucas | June 10, 1952 |